United States Patent
Iwase et al.

(10) Patent No.: US 7,476,796 B2
(45) Date of Patent: Jan. 13, 2009

(54) IMAGE CONTROLLING APPARATUS CAPABLE OF CONTROLLING REPRODUCTION OF IMAGE DATA IN ACCORDANCE WITH EVENT

(75) Inventors: Hiroyuki Iwase, Hamamatsu (JP); Akira Iizuka, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 0 days.

(21) Appl. No.: 10/369,251

(22) Filed: Feb. 18, 2003

(65) Prior Publication Data
US 2003/0156078 A1   Aug. 21, 2003

(30) Foreign Application Priority Data
Feb. 19, 2002   (JP) .............. 2002-042185

(51) Int. Cl.
G09B 15/00   (2006.01)
G09B 15/02   (2006.01)
G10H 1/00   (2006.01)

(52) U.S. Cl. .................. 84/477 R; 84/600; 84/615; 84/616; 84/723; 84/DIG. 6

(58) Field of Classification Search ........... 84/600–602, 84/609–610, 615–618, 649–650, 653–656, 84/477 R, 478, DIG. 6
See application file for complete search history.

(56) References Cited

U.S. PATENT DOCUMENTS

| | | | |
|---|---|---|---|
| 5,777,251 A * | 7/1998 | Hotta et al. .................. 84/609 |
| 6,087,577 A | 7/2000 | Yahata et al. | |
| 6,245,982 B1 * | 6/2001 | Suzuki et al. ............. 84/477 R |
| 6,310,279 B1 | 10/2001 | Suzuki et al. | |
| 6,555,737 B2 * | 4/2003 | Miyaki et al. ............. 84/477 R |
| 6,573,909 B1 * | 6/2003 | Nagao ....................... 715/727 |
| 6,702,677 B1 * | 3/2004 | Fujisawa et al. ............. 463/43 |
| 2002/0040633 A1 * | 4/2002 | Miyaki et al. ............. 84/477 R |

FOREIGN PATENT DOCUMENTS

| EP | 0 945 849 | 9/1999 |
|---|---|---|
| GB | 2 328 553 | 2/1999 |

(Continued)

OTHER PUBLICATIONS

U.S. Appl. No. 09/197,184, "System of Generating Motion Picture Responsive to Music", filed Nov. 20, 1998.

*Primary Examiner*—Marlon T Fletcher
(74) *Attorney, Agent, or Firm*—Morrison & Foerster LLP

(57) ABSTRACT

In an image controlling apparatus, an image data input from an image reproducing device 14 to a motion picture recording unit 71 is stored in a RAM 72 by making the image data corresponding to an event by a pad operation in a recording mode RM. Also, in a play mode PM, a data reading unit 73 selectively reads the image data from the RAM 72 in accordance with an event by a pad operation. In an external controlling mode, an image data is selectively read from the RAM 72 in accordance with detection of an event from an external input signal. An image controlling unit 74 generates an image signal in accordance with the read image data, adds an image effect, synthesizes with a real time image signal from the image reproducing device 14, and displays a corresponding image on an image display 15.

14 Claims, 9 Drawing Sheets

FOREIGN PATENT DOCUMENTS

| | | |
|---|---|---|
| JP | 63-227397 | 9/1988 |
| JP | 3-216767 | 9/1991 |
| JP | 8-30807 | 2/1996 |
| JP | 10-108127 | 4/1998 |
| JP | 11-223084 | 8/1999 |

* cited by examiner

FIG.4

| (BANK-A) | | |
|---|---|---|
| Iv | PAD | NOTE NUMBER |
| A-1 | Pd 1 | C1 |
| A-2 | Pd 2 | D1 |
| A-3 | Pd 3 | E1 |
| A-4 | Pd 4 | F1 |
| A-5 | Pd 5 | G1 |
| A-6 | Pd 6 | A1 |
| A-7 | Pd 7 | B1 |
| A-8 | Pd 8 | C2 |

| (BANK-B) | | |
|---|---|---|
| Iv | PAD | NOTE NUMBER |
| B-1 | Pd 1 | D2 |
| B-2 | Pd 2 | E2 |
| B-3 | Pd 3 | F2 |
| B-4 | Pd 4 | G2 |
| B-5 | Pd 5 | A2 |
| B-6 | Pd 6 | B2 |
| B-7 | Pd 7 | C3 |
| B-8 | Pd 8 | D3 |

| (BANK-C) | | |
|---|---|---|
| Iv | PAD | NOTE NUMBER |
| C-1 | Pd 1 | E3 |
| C-2 | Pd 2 | F3 |
| C-3 | Pd 3 | G3 |
| C-4 | Pd 4 | A3 |
| C-5 | Pd 5 | B3 |
| C-6 | Pd 6 | C4 |
| C-7 | Pd 7 | D4 |
| C-8 | Pd 8 | E4 |

IMAGE CONTROLLING APPARATUS CAPABLE OF CONTROLLING REPRODUCTION OF IMAGE DATA IN ACCORDANCE WITH EVENT

CROSS REFERENCE TO RELATED APPLICATION

This application is based on Japanese Patent Application 2002-042185, filed on Feb. 19, 2002, the entire contents of which are incorporated herein by reference.

BACKGROUND OF THE INVENTION

A) Field of the Invention

This invention relates to an image controlling apparatus that can render various kinds of images by arbitrary controlling a reproduction of an image in accordance with an event.

B) Description of the Related Art

There have been a large number of image editing apparatuses that store and edit a plurality of image data. The image editing apparatus outputs an image after editing it, and it outputs the image not depending on an occasion selectively, therefore it is not on real time base.

SUMMARY OF THE INVENTION

It is an object of the present invention to provide an image controlling apparatus that can render various kinds of images by outputting a reproduced arbitrary image data at any timings in an arbitrary state corresponding to an event.

According to one aspect of the present invention, there is provided an image controlling apparatus, comprising: a storage device that stores a plurality of image data respectively corresponding to a plurality of events; a reading device that sequentially reads, in accordance with a sequential generation of one of the plurality of the events, the image data corresponding to the generated event from the storage device; and an image outputting device that interchangeably outputs an image signal corresponding to an image to be displayed on a display in accordance with the sequentially read image data.

According to the image controlling apparatus in the present invention, an image data is recorded by making the image data corresponding to an event, and when an event is input at the time of reproduction, the image data is read out corresponding to the event in order to reproduce the image on a display. Therefore, an image that is necessary for the reproduction and corresponding to the input event is arbitrary read out and selected from prepared images.

According to the present invention, an image data input from an external apparatus is recorded by making the image data corresponding to an event (a pad operating event) generated by an operation of a pad switch, and the image data is read out with corresponding to the pad operation event at the time of the reproduction. Therefore, by recording image data that are prepared before hand just like a sampler (a sampling device), a necessary image data can be read or selected form those recorded image data in accordance with necessity at a time of reproduction.

Further, by generating each event by using a bank switch in addition to the pad switch, not only the number of image data prepared for the image reproduction can be increased, but the image data can be stored systematically, for example, the same number of similar variations of the image data as the bank switches are assigned to the pad switches respectively, and a large number of image data are stored and sorted in accordance with kinds of the banks. Also, at the time of reproduction, variety of images can be reproduced by combination of operations of both switches.

According to the present invention, corresponding image data can be reproduced in accordance with a remote event detected from a signal input from an external apparatus. As a remote input event, particularly by using an event (music or MIDI event) based on detection such as a note data of a MIDI signal, variety of images corresponding to musical progress can be rendered.

According to the present invention, when a new event is generated, image data corresponding to the new event is read out based on the event generated before regardless of whether other data is read out or not. Therefore, when the new event is generated, for example, reading out of the image data of the previous event is suspended and only the new image by the new event can be displayed, and reading out of the image data of the previous event is continued, the old image and the new image can be displayed at the same time by an image division or an image overlay.

According to the present invention, other image input from an external image information device such as an image reproducing device is synthesized to the image based on the stored image data to display, variety of image can be rendered by a proper displaying method such as the overlay. Further, by adding a predetermined image effect to displayed one or plural image(s), more various image effects can be obtained.

BRIEF DESCRIPTION OF THE DRAWINGS

FIG. 4 is a diagram showing an example of assignment of MIDI events to the pads according to according to the embodiment of the present invention.

DETAILED DESCRIPTION OF THE PREFERRED EMBODIMENTS

Figure 1:
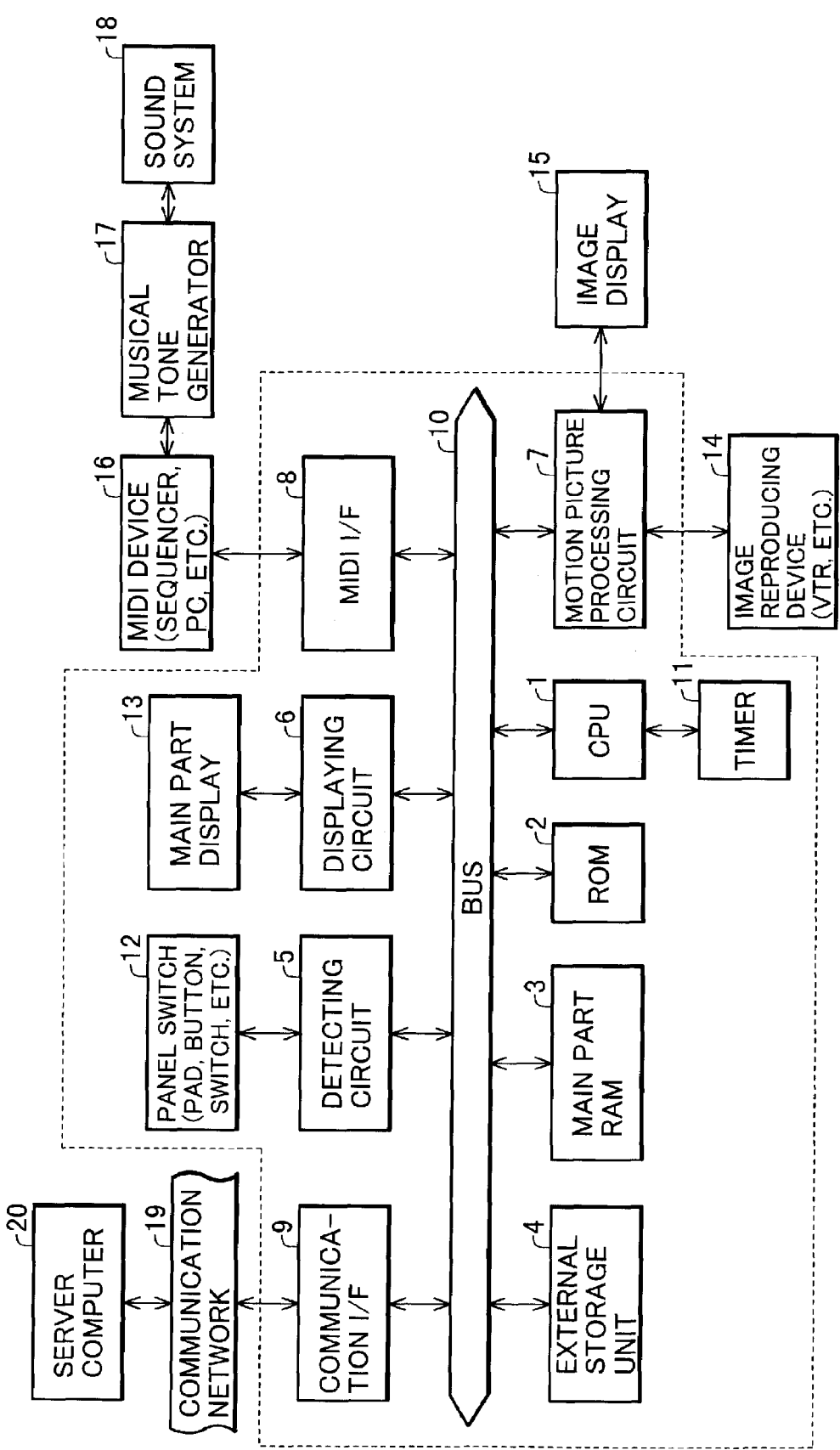
FIG. 1 is a block diagram showing hardware structure of an image controlling system according to an embodiment of the present invention.

FIG. 1 is a block diagram showing hardware structure of an image controlling system according to an embodiment of the present invention. In this example, the image controlling system has a main part system (a main part controlling unit), a motion picture processing system (a motion picture processing unit) and an interface (I/F) unit. In the main part system, a central processing unit (CPU) 1, a read only memory (ROM) 2, a main part side random access memory (a main part RAM) 3, an external storage device 4, a detecting circuit 5 and a display circuit 6 are included. Also, the motion picture processing system has a motion picture processing unit 7, and the I/F unit has a MIDI interface (MIDI, I/F) 8 and a communication interface (communication I/F) 9. These units 1 to 9 are connected each other via a bus 10.

The CPU 1 that controls the whole image controlling apparatus executes various controls by using a clock supplied from a timer 11 in accordance with a predetermined software program. Especially, the CPU 1 manages an image control by the later-described motion picture processing circuit 7. In the ROM 2, predetermined controlling programs for controlling the image controlling apparatus are stored, and these programs contain programs for managing image control according to the present invention, various tables and various data in addition to basic information processing. The main part RAM 3 works as a temporary storage unit for storing necessary data and parameters at the time of various processes.

The external storage device may be consisted of a hard disk drive (HDD) and a device that can use a removable storage medium such as a compact disk read only memory (CD-ROM), a flexible disk (FD), a magneto optical (MO) disk, a digital versatile disk (DVD), a ZIP, a memory card (smart media), a semiconductor memory or the like, and it can store various kinds of controlling programs and data. Therefore, programs necessary for image controlling and the various kinds of controlling data not only uses the ROM 2, but also is read from the external storage device 4 to the RAM 3, and it can also store processing result in the external storage device 4 depending on necessity. Also, in the external storage device 4 such as the memory card, image data and management data that includes image controlling data (hereinafter called a reproducing condition) such as an image effect accompanying the image data can be stored.

A panel switch device 12 is connected to the detecting circuit 5 and equipped with various kinds of switches and keys and other types of operators. These switches are also called panel switches and are used for inputting information for mode settings such as image storing and normal play (reproduction) and settings of various kinds of parameters by a user for executing a process such as image control, etc. For example, mode designating switches (M1 to M3) are used for designating mode excluding play mode, and bank or pad switches (B1 to B3, Pd1 to Pd8) are used for selectively designating an image data from a bank on real time base in a record or a play mode.

The displaying circuit 6 is equipped with a main part display 13 such as a liquid crystal display (LCD) and various kinds of indicators, and settings and instructions concerning to image display are executed by executing a necessary operation with a switch of the panel switch 13 using the main part display 13 in the display circuit 6. Also, the main part system (main part controlling unit) is consisted of the above-described elements 1 to 6 and 10 to 13, and the image controlling apparatus is consisted of a motion picture processing circuit 7 with elements 1 to 13 and interfaces 8 and 9 within a dotted line.

The motion picture processing unit 7 is equipped with a specialized RAM, and an image reproducing devices 14 such as a VTR, a video disk reproducing device, etc. and an image display 15 that relatively has a large display such as a large CRT and a projector are connected to it. By the motion picture processing circuit 7, a video signal (image picture signal) from the image reproduction unit 14 is stored or processed on real time base to reproduce image information in various states. Then, the image based on the image information can be displayed on the image display 15. The motion picture processing system (motion picture processing unit) is consisted of the motion picture processing circuit 7, the image reproduction unit 14 and the image display 15.

On the other hand, a MIDI device 16 that is consisted of an audio sequencer (MIDI sequencer) that has a sound information generating function or a personal computer (PC) is connected to a MIDI I/F 8, and a sound system 18 including a DSP (digital signal processor) and loud speakers are connected to the MIDI device 16 via a musical tone generator 17. A musical performance system (music performance unit) that is externally connected to the image controlling system is consisted of those devices 16 to 18.

The MIDI device 16 can reproduce music by generating sound in accordance with its own music data and the music data stored in the ROM 2 or the external storage unit 4 via the musical tone generator 17 and the sound system 18. Also, the MIDI device 16 works as a controlling function for controlling the motion picture processing circuit 7 in accordance with the MIDI event (note data such as note on/off), a MIDI clock and a controlling code output from the MIDI device 16 to the image controlling device.

Also, the communication interface (I/F) 9 is connected to a server computer 20 and the like for being able to exchange information via communication networks and the like such as a local area network (LAN), the Internet, a telephone line and the like. Various kinds of data such as the controlling program, music data, image data and the like can be downloaded from the server computer 16, the MIDI device 16, the motion picture processing circuit 7 and the like and stored in the external storage device 4.

Figure 2:
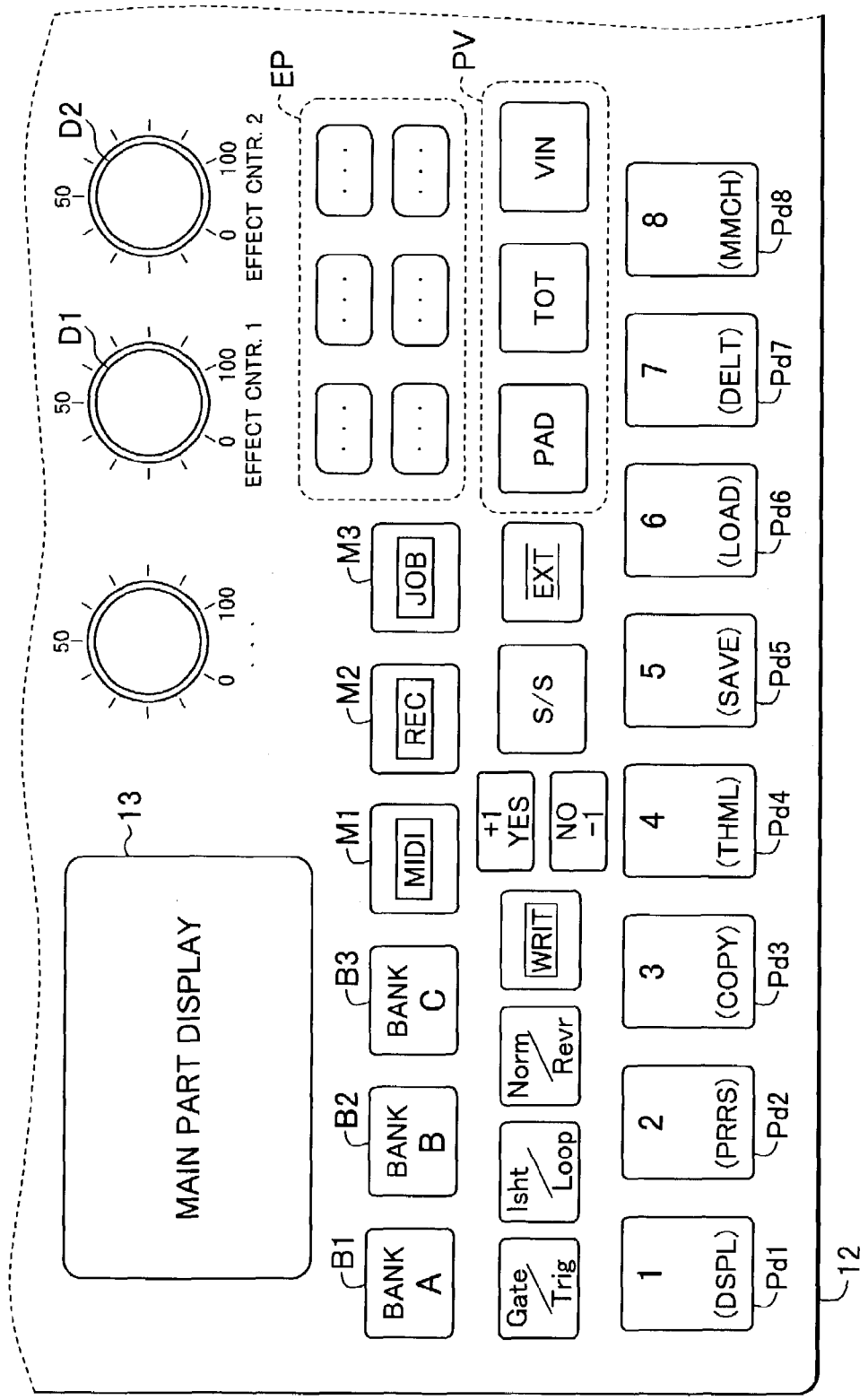
FIG. 2 is an example (a part) of structure of operation panel provided on a front of the image controlling apparatus according to the embodiment of the present invention.

FIG. 2 shows an example (a part) of a structure of an operation panel provided on a front of the image controlling apparatus according to the embodiment of the present invention. On this operating panel are configured a plurality of bank switches Bi (I=1, 2, ..., m) and pad switches Pdj (j=1, 2, ..., n) for designating a storage area of an image data, and effect designating switches EP and effect setting dials D1 and D2 for designating and setting various image effects besides the display 13 for displaying an operation status and a setting status of the panel switch 12, the mode designating switches M1 to M3.

There are an external control mode designating switch (MIDI button) M1, a recording mode designating switches (REC button) M2 and a job mode designating switch (JOB button) M3 as the mode designating switches M1 to M3. By operating these switches M1 to M3, this image controlling apparatus can be entered to various modes other than a play mode (switch reproduction mode or PLAY mode). That is, in the embodiment of the present invention, the image controlling apparatus enters into the play mode just after the power of the image controlling apparatus is turned on as a default. On the other hand, when one of the mode designated switches M1 to M3 are operated, the back light of the image controlling device is turned on, and the mode corresponding to the operated switch can be set to the image controlling apparatus.

Further, after entering these modes, the mode is terminated by re-operation of each of switches M1 to M3, the operations of other mode designating switch M1 to M3, and the back light of the mode designating switches M1 to M3 is turned off to return to the play mode or changes to the other modes. Also, a start/stop switch (S/S) is used for starting/terminating of a predetermined operation in each mode, and an exit (EXT) switch is used for returning to an initial state in each mode.

By operating an arbitral bank switch Bi or a pad switch Pdj, an individual event Iv called "a pad operating event" is generated, and a storage area of the image data can be designated by this pad operating event. Further, in these switches, the back light is turned on by the selecting operation as same as the mode designating switches M1 to M3 to inform a selection of the pad to a user, and the turned-on back light is turned off by the operation of the other pad switch or the other predetermined switch.

In the example shown in FIG. 2, three bank switches Bi to B3 and eight pad switches Pd1 to Pd8 are provided (m=3, N=8), and 24 events Iv can be assigned. In each event Iv, an event ID indicated as "A-1" to "A-8", "B-1" to "B-8", or "C-1" to "C-8" is provided corresponding to the pad switches Pd1 to Pd8 for each bank switch B1 to B3.

Figure 3:
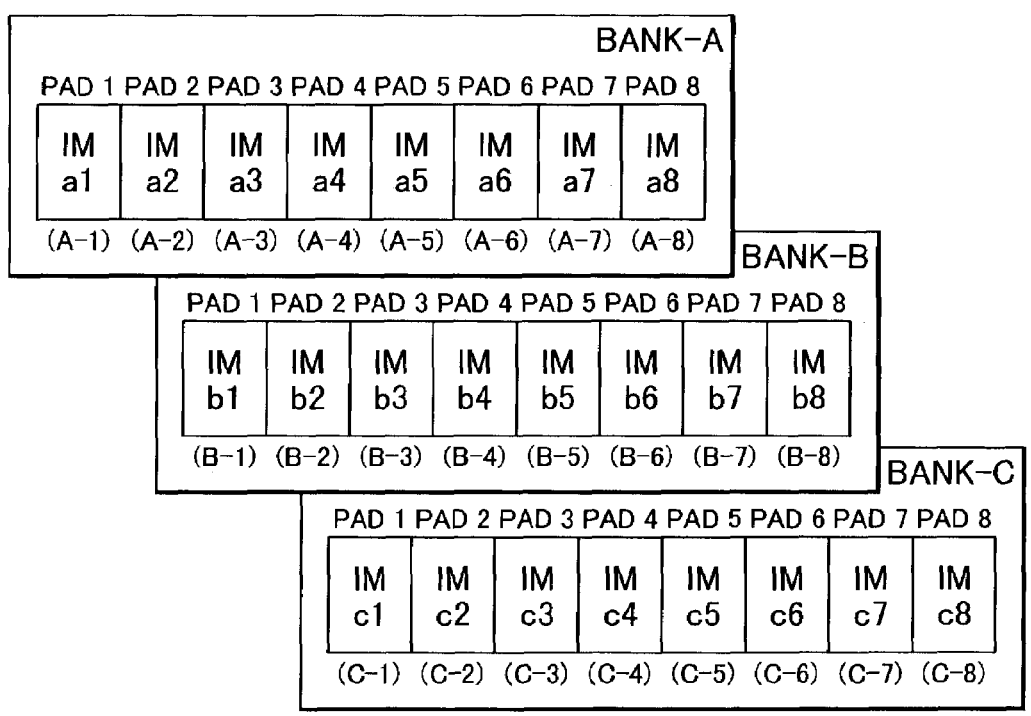
FIG. 3 is a diagram showing an example of structure of an image memory according to the embodiment of the present invention.

In the embodiment of the present invention, a plurality (m) of large storage areas called bank (BANK) and a plurality (n) of small storage areas called pad (PAD) corresponding to a structures of the above-described bank switch Bi and the pad switch Pdj are formed in the image data storage area of the image memory (specialized RAM) corresponding to an event Iv, and the image data can be stored in each of the plurality of the small storage areas PADs provided in each of the large storage area BANKs. FIG. 3 shows an example of the structure of the image memory according to the embodiment of the present invention.

In the example of the memory structure of the 3 banks-8 pads shown in FIG. 3, a plurality of banks BANK-A to BANK-C corresponding to the bank switches B1 to B3 are set in a specialized RAM 72 that stores the image data, and a plurality of the image data storage areas, the pads PAD1 to PAD8 are set in each bank BANK-A to BANK-C respectively corresponding to the pad switches Pd1 to Pd8. That is, the pads PAD1 to PAD8 of each bank BANK-A, BANK-B and BANK-C are corresponding to "A-1" to "A-8", "B-1" to "B-8", and "C-1" to "C-8".

Therefore, in the play mode, the recording mode (sampling mode or REC mode) and the like by the operation of a recording mode designating switch (REC button) M2, a pad operating event Iv ("A-1" to "C-8") that instructs specific banks (BANK-A to BANK-C) and pads (PAD1 to PAD8) in the image memory (specialized RAM) 72 is generated by operating the bank switch Bi and the pad switch Pdj. Corresponding to the generation of this event Iv, a pad corresponding to the pad switch operation is designated from the pads PAD1 to PAD8 in the bank designated by the bank switch Bi.

By that, in the recording mode, image data "IMa1" to "IMa8", "IMb1" to "IMb8" and "IMc1" to "IMc8" are stored in the designated pads PAD1 to PAD8 in the designated banks BANK-A to BANK-C. In the play mode, image data "IMa1" to "IMa8" are selectively read out from the pads BANK-A, PAD1 to BANK-C, and PAD8 of the designated bank to be reproduced. Further, image data "IMa1" to "IMc8" stored in each pad are called a pad image data.

In the embodiment of the present invention, with corresponding to an external input event detected from an external input signal to the image data storage area of the image memory (specialized RAM), a corresponding pad image data is read out from the image memory and reproduced in accordance with the generation of the external input event. The external input signal is, for example, a MIDI signal that is input in the image controlling apparatus from the external MIDI device 16 via the MIDI I/F 8. Also, when a note data in the MIDI signal is detected in a state that the image controlling apparatus is in an external controlling mode (MIDI mode) by operation of an external controlling mode designating switch (MIDI button) M1, an external input event Iv called MIDI event (or "music event") is generated. FIG. 4 shows an example of assignment of MIDI events to the pads according to the embodiment of the present invention.

In the assignment example shown in FIG. 4, events "A-1" to "C-8" of an event Iv have note numbers "C1" to "E4" included in a note (ON/OFF) data of a MIDI signal to be respectively correlated with the pads PAD1 to PAD8 of the banks BANK-A to BANK-C in the image memory (the specialized memory) 74. When the image controlling apparatus is entered in the external controlling mode by the operation of the external controlling mode designating switch M1 and a note on data is detected from a MIDI signal, a MIDI event Iv of the event ID "A-1" to "C-8" corresponding to the note number "C-a" to "E-4" of the note on data is generated, and the banks BANK-A to BANK-C and pads PAD1 to PAD8 corresponded to the event ID is designated. Therefore, pad image data "IMa1" to "IMc8" stored in the designated pad are selectively read out and reproduced.

Further, although, as a general rule, reading of the reproducing image data is suspended when a note off data for the note of the note number is detected, the reproduction may be terminated after all the pad image data are read out or after a predetermined time elapsed depending on the panel setting (a reproduction procedure parameter). Also, the reproduction may be terminated upon a detection of a next MIDI event Iv even if the reproduction does not reach the termination point. A terminating condition of the reproduction may be arbitrarily changed in accordance with necessity, and the changed condition may be included in the management data as a reproduction condition.

When the image controlling apparatus is in the job mode (JOB mode) by operating a job mode designating switch (JOB button) M3, the pad switches Pd1 to Pd8 can be diverted to a predetermined job operation. For example, in the job mode, the pad switches Pd1 to Pd8 can be used as follows: the pad switches Pd1 (PADL) can be used for setting a display state of the display 13; pad switches Pd2 (PRRS) can be used for resetting various parameters to standard values; pad switches Pd3 (COPY) can be used for copying (duplicating) the pad image data IMa1 to IMc8 and the management data to other pads; and pad switches Pd4 (THML) can be used for displaying thumbnails of the pad image data IMa1 to IMc8.

A pad switch Pd5 (SAVE) stores the pad image data IMa1 to IMc8 and management data in the external storage device (for example, a smart media) 4 from the specialized RAM. Also, a switch Pd6 (LOAD) loads the management data from the external storage device 4 to the specialized RAM, and a switch Pd7 (DELT) is used for deleting the image data and the management data. And a switch Pd8 (MMCH) is used for setting a receiving MIDI channel.

In the job mode, the pad switches Pd1 to Pd8 can also be used for, in addition to the job process that diverts as described in the above, various settings of an image effect parameter and reproduction order parameter used as reproduction condition in the reproduction mode (the play mode and the external controlling mode) by using other panel switches. The progress and the results of the diverting setting for applying the pad point operations are displayed on the display 13.

The effect designating switches EP are used for designating various image effects to a reproduced image in the reproduction modes (the play mode and the external controlling mode) and the job mode. Then, the image effect parameter designated by each effect designating switch is set/changed at an effect setting dials D1 and D2, and setting/changing status is stored in the specialized RAM 72 as one of the reproduction conditions of the management data. Further, it can be stored in the external storage device (smart media and the like) 4 in the job mode.

As a target of the image effect, one of the followings can be selected with the image selecting switches PV: a real-time video signal (VIN) input from the image reproducing device 14; one of the pad image data (PAD); and a whole image output (TOT) including the both of them. Further, when the effect is added to an image (PAD) by each pad image data IMa1 to IMc8, the image data IMa1 to IMc8 are selected by the bank switches B1 to B3 and the pad switches Pd1 to Pd8, and an effect adding process can be executed.

Further, a video signal ("VIDEO") selecting switch (VIN) and a whole selecting switch (TOT) in the image selecting switches PV have a function to give an instruction for inputting a real time image signal from the image reproducing device 14 to the image controlling unit 74 in the reproduction modes (the play mode and the external controlling mode). The video signal selecting switch (VIN) also has a function to give an instruction for inputting an image signal from the image reproducing device 14 to the motion picture recording unit 71 in the recording mode.

Also, image effect parameters are set to regulate various image effects added to an image. The image effects parameters include a luminance parameter (Y), hue parameters (C, Cb, Cr), synthesizing (mixing/overlay) parameters for defining mixing types ("Add", "And", "Or", "Xor", etc.) of plurality of reproduced image and overlay types ("PAD & VIDEO", "PAD on VIDEO", "VIDEO on PAD", etc.) with a video signal, size/position parameters for regulating a size and a position of a reproduced image on a screen of the image display 15. After being selected from the parameter selecting switches EP, each of those parameters are set or changed by selecting a desired parameter from a parameter table displayed on the display 13 with a cursor (+1/−1) or by operating effect setting dials D1 and D2.

The reproduction conditions of the management data include other parameters such as reproduction procedure parameters for controlling the reading type of the pad image data, and the reproduction procedure parameters can be set by using three switches placed above the pad switches Pd1 to Pd3. For example, these switches can be operators that can change settings gradually as the operators are manipulated like a two-step setting of a four-step setting.

For example, a "Gate/Trig" switch is a four-step setting switch for setting reading types corresponding to generation and termination of events such as a pad operation event and a MIDI event. When "Gate" is set, reading of a pad image data is stated upon a generation of an on event and terminated upon an off event. When "Trig" is set, starting and terminating reading are repeatedly continued in sequence by reacting only on events. This "Gate/Trig" switch is also used for setting a reading starting position of the image data to a beginning point or a point the reading is stopped at the time of regeneration of an on event after the reading of the image data once being stopped.

A "1shot/Loop" switch is a two-step setting switch for setting a number of reading times of a pad image data. "One shot (1shot)" wherein a pad image data is reproduced once and "loop (Loop)" wherein a pad image data is reproduced repeatedly until an instruction for a pause or termination is given can be set with the "1shot/Loop" switch.

A "Norm/Revr" switch is a four-step setting switch for setting a reading direction of a pad image data. With the "Norm/Revr" switch, "normal (Norm)" wherein a pad image data is read in a normal direction and "reverse (Revr)" wherein a pad image data is read in a reversed direction can be set. The "Norm/Revr" switch can also set a display style at a time of pausing reproduction of a pad image data to be displayed by a still picture with an image at the time of the pausing of the reproduction or not to be displayed.

On this front panel of the image controlling apparatus, an "ERIT" switch (a pad image data recording switch) is configured above the panel switch PD3. By operating this recording switch in the play mode, an instruction for recording a pad image data that of which the reproduction is processed in accordance with reproduction conditions can be generated. On this front panel also configured are various switches such as real time switches like a ribbon controller for controlling reproduction parameters for a recording speed, a mixture ratio of a plurality of images, etc. on real time base, a scratch pad and setting switches related to parameters at a time of reproduction, i.e., reproduction at a tempo (LoopTrPlay), etc.

Figure 5:
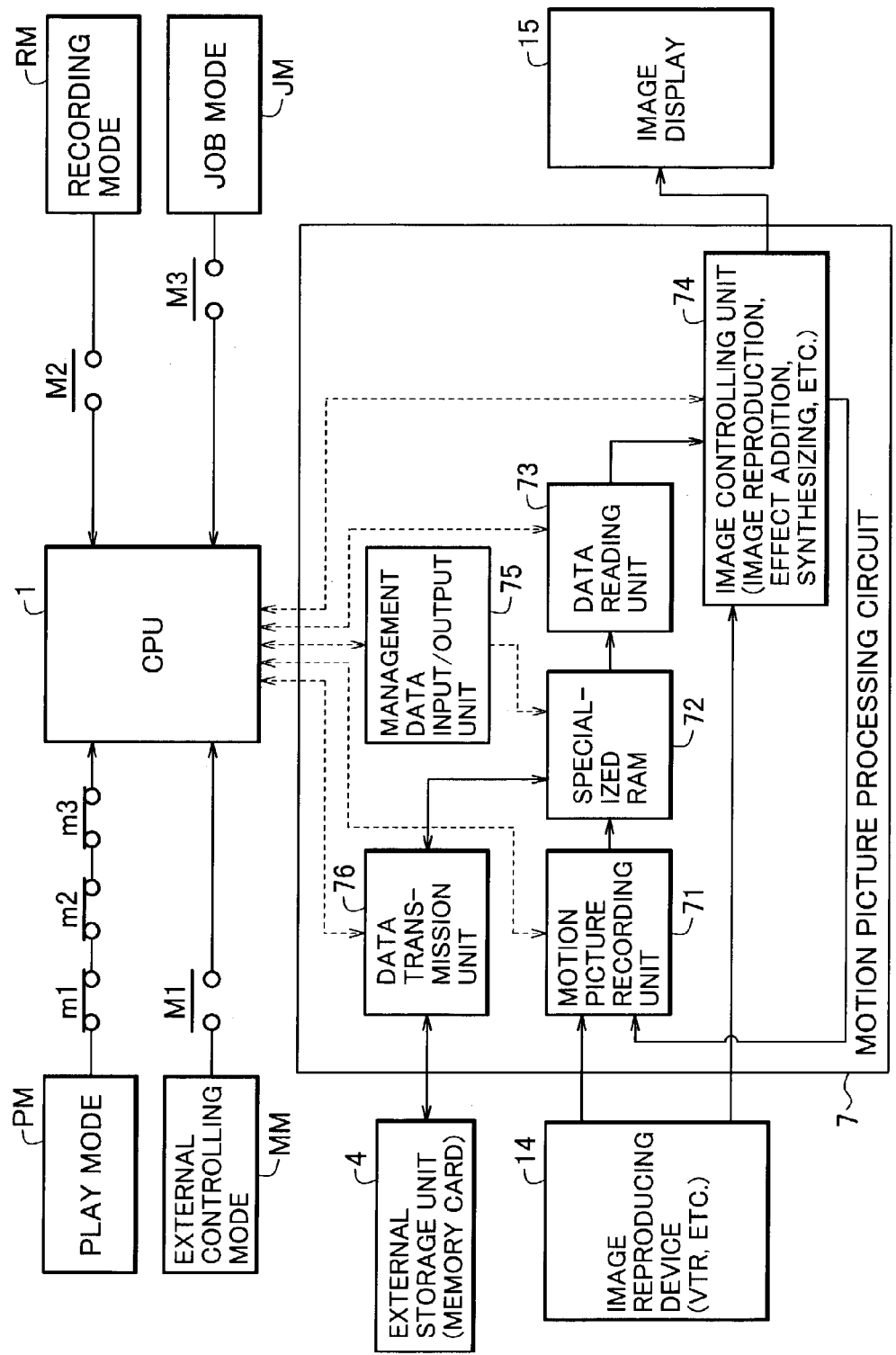
FIG. 5 is a functional block diagram of a motion picture processing unit in the image controlling system according to the embodiment of the present invention.

FIG. 5 is a block diagram showing functions of a motion picture processing system (the motion picture processing unit) according to the embodiment of the present invention. The motion picture processing circuit 7 has a motion picture recording unit (a video sampler) 71, a specialized RAM (an image memory) 72, a data reading unit 73, an image controlling unit 74, a management data input/output unit 75 and an image transmission unit 76. The CPU 1 that controls these units operates in the play mode (an operator reproduction mode or the PLAY mode) PM when none of the mode designating switches M1 to M3 of the panel switch device 12 (no mode designated: all the switches m1 to m3 in the drawing are turned on). When one of the mode designating switches M1 to M3 is operated, the CPU 1 operates in the recording mode RM, an external controlling mode MM or the job mode JM respectively. The CPU 1 controls each unit of the motion picture processing circuit 7 in accordance with each mode.

The image controlling apparatus according to the embodiment will be briefly explained with reference to FIG. 5. In the recording mode RM, an image data input from the image reproducing device 14 to the motion picture recording unit 71 is stored in the RAM 72 specialized for storing image data as one of the pad image data IMa1 to IMc8 in accordance with an event generated by a pad operation. In the play mode PM, the data reading unit 73 selectively reads the pad image data IMa1 to IMc8 from the RAM 72 in sequence in accordance with an event generated by a pad operation. In the external controlling mode, every time a music event is detected in a received signal from the external device 16, at least one of the pad image data IMa1 to IMc8 corresponding to the detected event is selectively read from the RAM 72. The image controlling unit 74 generates an image signal from the read pad image data IMa1 to IMc8, also adds an image effect, and synthesizes it with a real time image signal from the image reproducing device 14. An image corresponding to the generated image signal (added with the image effect and/or synthesized with other image signal) is displayed on the image display 15.

More detailed explanation of the image controlling apparatus will be given below. A video signal (an image signal) is input from the external image reproducing device 14 such as a VTR or the like to the motion picture recording unit 71 that converts the input video signal to a digital image data by sampling. The specialized RAM 72 stores the digital image data converted by the motion picture recording unit 71. The specialized RAM 72 functions as storage for image data (an image memory) and also can store management data for an image processing. The management data includes reproduction conditions of an image data (also called as "reproduction parameters").

The data reading unit 73, in reproduction modes such as the play mode PM and the external controlling mode MM, reads reproduction conditions from a management data corresponding to the image data from the specialized RAM 72 at first and next reads the image data in accordance with the reproduction conditions. The image controlling unit 74 adds an image effect to the read image data and reproduces an image based on the read image data in accordance with the reproduction conditions. The image controlling unit 74 generates an image data to which the reproduction conditions are reflected and displays an image corresponding to that image data on the images display 15. In the reproduction modes PM and MM, the image controlling unit 74 can synthesize an image data with an external image signal input from the image reproducing device 14 and store the image data generated by the image controlling unit 74 in the specialized RAM 72 via the motion picture recording unit 71.

The management data input/output unit 75 functions as mediating means for transmitting/receiving reproduction conditions between the CPU 1 and the specialized RAM 72. For example, in each of the above-described modes, the management data input/output unit 75 stores reproduction parameters set or changed by using the panel switch device 12 into the specialized RAM 72 as reproduction conditions in a management data. Further, in the reproduction modes PM and MM, the management data input/output unit 75 reads out the reproduction conditions from the management data stored in the specialized RAM 72 to the CPU 1 and let the CPU control the data reading unit 73 and the image controlling unit 74.

The image transmission unit 76, in the job mode, functions as mediating means for transmitting/receiving a pad image data and a management data between the specialized RAM 72 and the external storage unit 4 such as a memory card (smart media) in accordance with the instruction of the CPU 1 when a saving or loading process for the pad image data or the management data is executed. In this case, the image transmission unit 76 stores the pad image data or the management data stored in the specialized RAM 72 into the external storage unit 4 or loads the pad image data or the management data stored in the external storage unit 4 into the specialized RAM 72.

Next, operations in the above-described modes are explained. First, when the recording mode designating switch (REC button) M2 is pushed the image controlling apparatus turns into the recording modes (the sampling mode or the REC mode) RM (i.e., the switch function element m2 is turned off). In the recording mode RM, an image signal input from the external image reproducing device 14 such as a VTR is input to the motion picture recording unit 71 in the motion picture processing circuit 7. The motion picture recording unit 71 converts the input image signal to a digital image data suited for recording by sampling in accordance with the instruction of the CPU 1 and stores the converted digital image data in a predetermined image data storage area (BANK, PAD) in the specialized RAM 72 in accordance with instructions of the bank and the pad switches Bi, Pdj.

Although each image data can be an arbitrary kind of an image data such as a motion picture, a still picture without limitation of the reproduction time length, the image data is preferable to be a motion picture data for a relatively short time about several seconds to tens of seconds or a plurality of still picture data continuously reproduced at a relatively low speed.

As described in the above, the selection of the image data storage areas in the recording modes RM is executed in accordance with the pad operation event generated by operating the bank and the pad switches Bi, Pdj as same as the case of the selection of the pad image data in the play mode PM. In a case of recording an image data in the recording modes, one of the pad areas PAD (1 to 8) corresponding to the operated pad switch Pdj in one of the bank areas BANK (A to C) corresponding to the operated bank switch Bi is designated when the pad operation event is generated by operating the bank and the pad switches Bi, Pdj. Next, by operating the start/stop switch (S/S), the recording of the image data to the designated pad is started and the image data is stored as a pad image data. Also, by re-operating the start/stop switch (S/S), the recording operation is terminated, and the mode returns to the play mode PM.

The play mode (switch reproduction mode or PLAY mode) is a default mode when the image controlling apparatus is turned on. In the play mode PM, the data reading unit 73 reads and reproduces a pad image data from the specialized RAM 72 in accordance with a pad operation event generated by operating the bank and the pad switches B1 to B3, Pd1 to Pd8 of the panel switch device 12. In this case, when no pad image data is assigned to a pad corresponding to the generated event, the displayed image will be transparent screen.

The external controlling mode (MIDI mode) MM is a reproduction mode when the external controlling mode designating switch (the MIDI button) M1 is pushed (the switch function element m1 is turned off). In the external controlling mode MM, the data reading unit 73 selectively reads and reproduces an image data from the specialized RAM 72 in accordance with a MIDI event corresponding to a note data when the note data of the set MIDI channel is detected from a MIDI signal input from the external MIDI device 16.

In the reproduction modes (the play mode PM and the external controlling mode MM), each of the pad operation events and the MIDI events, as described above with reference to FIG. 3 and FIG. 4, is assigned to the event ID and corresponds to each of pads (BANK-A PAD1 to BANK-C PAD8) of the specialized RAM 72; therefore, when one of the pad operation events and the MIDI events is generated, the storage area (BANK, PAD) of the specialized RAM 72 is designated in accordance with the assignment. Therefore, at the time of reproduction in the play mode PM or the external controlling mode MM, the data reading unit 73, under the control of the CPU 1, selectively and sequentially reads the pad image data corresponding to the pad operation events or the MIDI events from the plurality of pad image data stored in the plurality of pads in the specialized RAM 72 and transmits them to the image controlling unit 74.

The image controlling unit 74, under the control of the CPU 1, converts the pad image data read by the data reading unit 73 to an image signal added with a desired image effect set by using the panel switch device 12 and synthesizes it with a video signal input from the image reproducing device 14 on real time base. This image effect can be added to both of the pad image data and the video signal.

The image controlling unit 74, as described in the above, executes an image effect adding process for controlling the luminance (Y), the hue (C, Cb, Cr), synthesizing a plurality of images (mixing types of a plurality of reproduced images ("Add", "And", "Or", "Xor", etc.) of plurality of reproduced image and overlay types ("PAD & VIDEO", "PAD on VIDEO", "VIDEO on PAD", etc.) with a video signal), and a size and a position of a reproduced image on a screen of the image display 15. The image controlling unit 74, in the image synthesizing with an externally input image signal, generates an image signal by synthesizing a image information (e.g., as a main image) from the data reading unit 73 and video information (e.g., as a background image) input from the image reproducing device 14 on a real time base (so called "incontinent") and displays the synthesized image on the image display 15.

Further, various image rendering effects can be used for displaying a plurality of images (color images) by the image controlling unit 74, such as simple overlay of the plurality of the images, cross fading related to each image, calculating a logical sum or a logical product for the reproduced image and a real time image, varying display area of both images while displaying both images independently, etc.

The data reading unit 73 can reproduce an image by a method called "a looping reproduction" wherein a part or the entire image data selected from the specialized RAM 72 is repeatedly reproduced in accordance with an instruction from the CPU 1 based on the reproduction parameter (LOOP). In the looping reproduction, it is necessary to consider for reproducing seamlessly without a failure such as a frame drop, a generation of empty screen, etc. Also, when a new event is generated during the reproduction of a motion picture in accordance with a last event, reproduction of the last motion picture is terminated and reproduction of a new motion picture in accordance with the new event can be started, or the reproduction of the new motion picture in accordance with the new event can be started while the reproduction of the last motion picture is continued to be reproduced.

Further, at the time of image reproduction in the play mode PM or the external controlling mode MM, the motion picture processing circuit 7 can be controlled by a control code or a MIDI clock included in a MIDI signal input from the external MIDI device 16 such as an audio sequencer, etc. When a MIDI channel is set by the panel switch device 12 in advance, for example, the similar parameter settings can be executed by the control code in the MIDI signal besides each parameter setting switch of the panel switch device 12. Also, the MIDI clock (F8) in the MIDI signal can synchronize a reproduction time of the image with a tempo.

In the latter case, by setting the "reproduction at a tempo" (LoopTrPlay), the CPU 1 calculates a reading speed in accordance with the MIDI clock (F8) included in the MIDI signal on the target MIDI channel of the tempo setting and controls thereby the data reading unit 73. Therefore, the looping reproduction can be executed with controlling the reading time of the pad image data read from the specialized RAM 72 while synchronizing the reproduction of the pad image data and a musical performance of the external MIDI device 16.

Moreover, in the reproduction modes PM and MM, each pad image data processed in accordance with the reproduction parameters can be stored in a predetermined storage area corresponding to the original pad image data in the specialized RAM 72 by an operation of the "WRIT" switch (FIG. 2) from the image controlling unit 74 via the motion picture recording unit 71 depending on the necessity.

The job mode (JOB mode) JM is a mode when the job mode designating switch (JOB button) is pushed (i.e., the switch function element m3 is turned off). In the job mode, the functions of the pad switches Pd1 to Pd8 of the panel switch device 12 can be diverted for executing the functions of the job mode.

As The functions of the job mode, for example, as described in the above, the display control of the display 13, resetting the parameters to the standard values, moving, copying, saving, loading and deleting a pad image data, setting a receiving MIDI channel, etc. can be executed. When the saving or loading process of the management data between the specialized RAM 72 and the external storage unit 4 such as a memory card (smart media) in the job mode, the data is transmitted/received via the image transmission unit 76.

In the job mode, besides the job functions, the above-described reproduction parameters such as image effect parameters and reproduction procedure parameters can be set off line with reference to a screen of the main display 13, and the set reproduction parameters can be stored as reproduction conditions in a management data before reproduction of the image data. In this case, a pad or a pad image data of which parameters are to be set can be designated by simultaneous operations of the bank switch Bi and the pad switch Bdj.

FIG. 6 to FIG. 9 show a flow chart of an image controlling process according to the embodiment of the present invention. At first Step P1, an execution of a predetermined program is started upon truing on of the main power, the RAM 3 and the RAM 72 is cleared to be initialized, and the various image controlling parameters are reset to be the standard values. Then, processes based on the image controlling process flow after Step P2 are repeated until the main power is turned off. At Step P2, the mode is set. For example, when there is no switch operation after the initialization, the play mode PM is set, and a sample pad image data and a standard (default) reproduction conditions are loaded to the specialized RAM 72. When one of the mode switches M1 to M3 is operated, the mode corresponding to the operated mode switch is set. After that, this Step P2 is past thorough unless a changing operation toward the set mode is detected.

At next Step P3, whether other panel switch other than the mode switches M1 to M3 is operated or not is judged. When the other switch is not operated (P3→NO) the flow proceeds to Step P4, and whether a signal is input from the external MIDI device 16 or not is judged at Step P4. When there is no input (P4→NO) at Step P4, the flow proceeds to Step P5. At Step P5, whether reproduction of a pad image data is in progress or not is judged. When the reproduction is not in progress (P5→NO), the flow returns to Step P2.

When there is input from the panel switch device 12 or the external MIDI device 16 (P3, P4→YES), the flow proceeds from Step P3 or P4 to Step P5, and whether the input is an instruction for recording an image data or not is judged. When the input is an instruction related to an image recording by the operation of the REC button M2 in the recording mode RM (P5→YES), the flow proceeds to processes for the recording mode RM at Steps P7 to P14 shown in FIG. 6 to FIG. 7.

At Step P7, a selection of an assignment position (pad) in accordance with selective operations of the bank switch Bi and the pad switch Pdj is accepted. That is, the recording time pad operation event Iv selected by the operations of the bank switch Bi and the pad switch Pdj is accepted, and the storage area (pad) in the specialized RAM 72 to which the image data to be recorded is assigned is defined in accordance with the event ID (A-1 to C-3) corresponding to the accepted event Iv.

At Step P8, an instruction for starting the recording is accepted, and at Step P9 (FIG. 7), whether the instruction for starting the recording is received or not is judged. The processes at Step P8 and Step P9 are repeated until the instruction for starting the recording is received (i.e., while P9→NO). When the start/stop switch (S/S) is operated and the instruction for starting the recording is received here (P9→YES), the flow proceeds to Step P10. At Step P10, the motion picture recording unit 71 is operated to start the recording, and the image data based on the image signal input from the image reproducing device 14 is stored in the storage area in the specialized RAM 72 having the event ID (A-1 to C-8) defined at Step P4, i.e., in the pad (BANK-A PAD1 to BANK-C PAD8).

Figure 6:
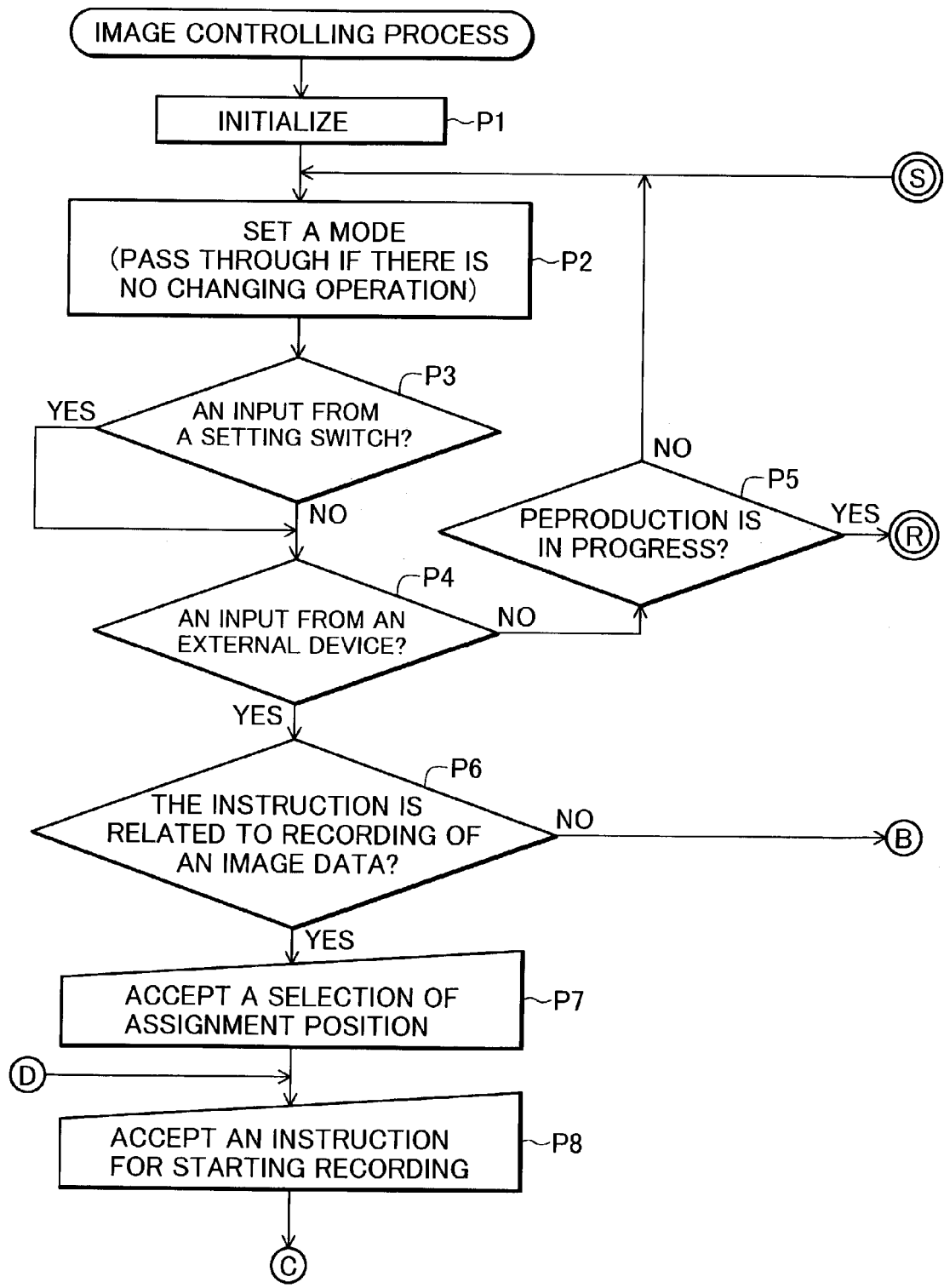
FIG. 6 is a first part (1/4) of a flow chart showing image controlling process according to the embodiment of the present invention.

At Step P11, an instruction for stopping (or pausing) the recording is accepted. At Step P12, whether the instruction for stopping the recording is received or not is judged. The processes at Step P11 and Step P12 are repeated until the instruction for stopping the recording is received. When the start/stop switch (S/S) is operated and the instruction for stopping the recording is received here (P12→YES), the flow proceeds to Step P13, and the recording of the image data is stopped. At Step P14, a management data related to recording conditions (an image quality, resolution, etc.) of the image data is created and stores the created management data into the specialized RAM 72 with making it corresponding to the image data. Then, after the creation of the management data, the flow returns to Step P2 (FIG. 6).

Further, when a user do not want to record an image data and create a management data in the operation and processes in the recording mode RM at Step P7 to Step P14, the user can make the image controlling apparatus return to the initial state of the recording mode RM with passing unnecessary steps by operating an exit (EXIT) button at an arbitrary step. The returning to the initial state by the exit (EXIT) button is also possible in the other modes, for example, at Step P18, Step P25, Step P27, etc.

Figure 7:
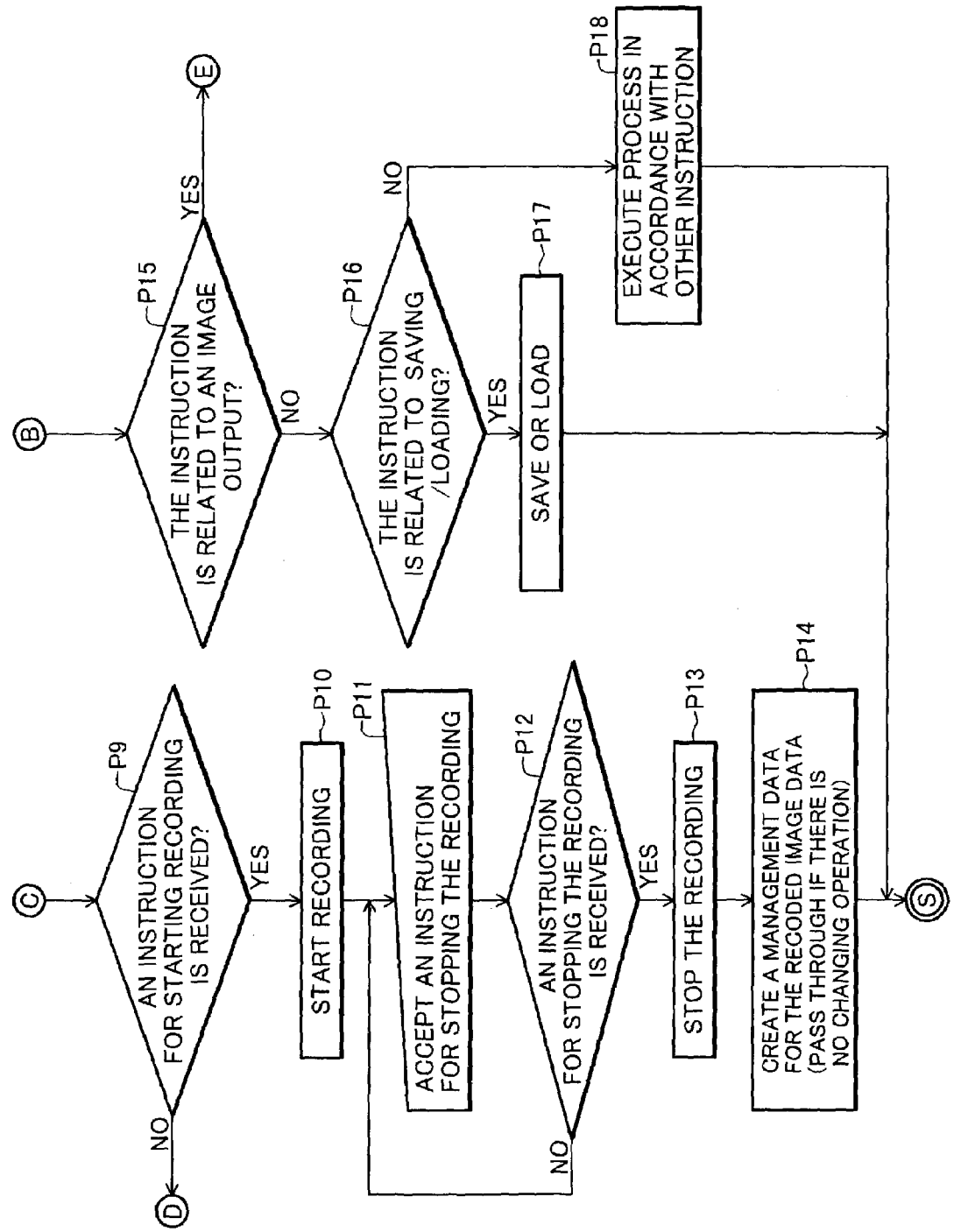
FIG. 7 is a second part (2/4) of the flow chart showing image controlling process according to the embodiment of the present invention.

At Step P6 (FIG. 6), when the instruction is not for the image data recording (P6→NO), the flow proceeds to Step P15 (FIG. 7). At Step P15, whether the instruction is related to an image output or not is judged. When the instruction is not related to the image output (P15→NO), whether the instruction is related to saving/loading of the data or not is judged at Step 16. When the saving (M3+Pd5) or the loading (Pd6) of the data is instructed here (P16→YES), the flow proceeds to Step P17. At Step P17, under the control of the image transmission unit 75, a pad image data and a management data corresponding to the pad image data in the specialized RAM 72 are saved to the external storage unit 4, or those data stored in the external storage unit 4 are loaded to the RAM 72.

When the instruction is judged as an instruction other than the saving or the loading of the data at Step P16 (P16→NO), the instructed process not directly related to the image output at Step P18. For example, the job processes such as the display control of the display 13, resetting the parameters to the standard values, moving, copying, saving, loading and deleting a pad image data, setting a receiving MIDI channel, etc. are executed. After the processes at Step P17 and P18, the flow returns to Step P2 (FIG. 6).

Figure 8:
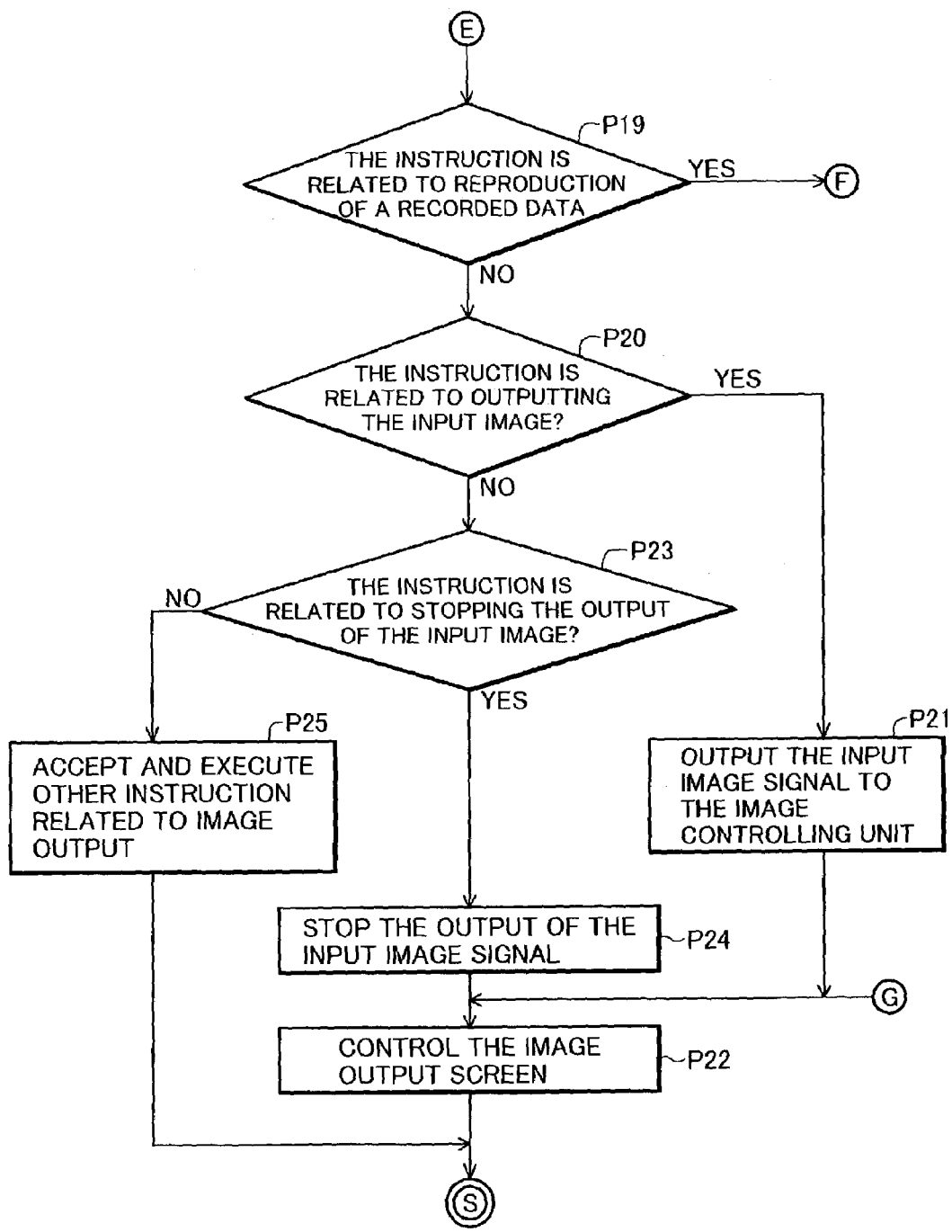
FIG. 8 is a third part (3/4) of the flow chart showing image controlling process according to the embodiment of the present invention.

When the instruction is judged as an instruction for outputting the image (P15→YES), the flow proceeds to Step P19 (FIG. 8). At Step P19, whether the instruction is related to the reproduction of a pad image data assigned to a pad or not is judged. When the instruction is not related to the reproduction of a pad image data (P19→NO), the flow proceeds to Step P20. At Step P20, whether the instruction is related to outputting an input image or not is judged.

When the instruction is judged as the input instruction (P20→YES), the flow proceeds to Step P21, and a command for outputting the external image signal input from the image reproducing device 14 via the process by the image controlling unit 74 is generated. Next, at Step P22, an image control based on the output command generated at Step P21 is executed by the image controlling unit 74 for an image output screen on the image display 15. The image controlling unit 74 executes the image control corresponding to the command and transmits an image display signal processed with the image control to the image display 15. The image display 15 executes a drawing process based on the image display signal to display a desired image on the screen. Then, after the process at Step P22, the flow returns to Step P2 (FIG. 6).

When the instruction is judged as not to be related to inputting the external image signal at Step P20 (P20→NO), the flow proceeds Step P23. At Step P23, whether the instruction is related to stopping the output of the external image signal or not is judged. When the instruction is related to stopping the output of the external image signal (P23→YES), the flow proceeds to Step P24. At Step P24, a command for stopping the image output based on the externally input image signal to the image controlling unit 74. Then, at next Step P22, the image controlling unit 74 stops the image output to the image output screen of the image display 15, and the flow returns to Step P2 (FIG. 6) after that.

When the instruction is judged as not an instruction for stopping the output of the image signal at Step P23 (P23→NO), the flow proceeds to Step P24. At Step P24, other instructions related to an image output are accepted, and other processes are executed in accordance with the accepted instruction. In this case, the other instructions include instructions for setting reproduction at a tempo (LoopTrPlay), instructions generated by real time operation of the ribbon controller and the scratch pad, etc. The data reading unit 73 an the image controlling unit 74 are operated in accordance with real time parameters, etc. set in accordance with those instructions. Then, after those operation commands, the flow returns to Step P2 (FIG. 6).

Figure 9:
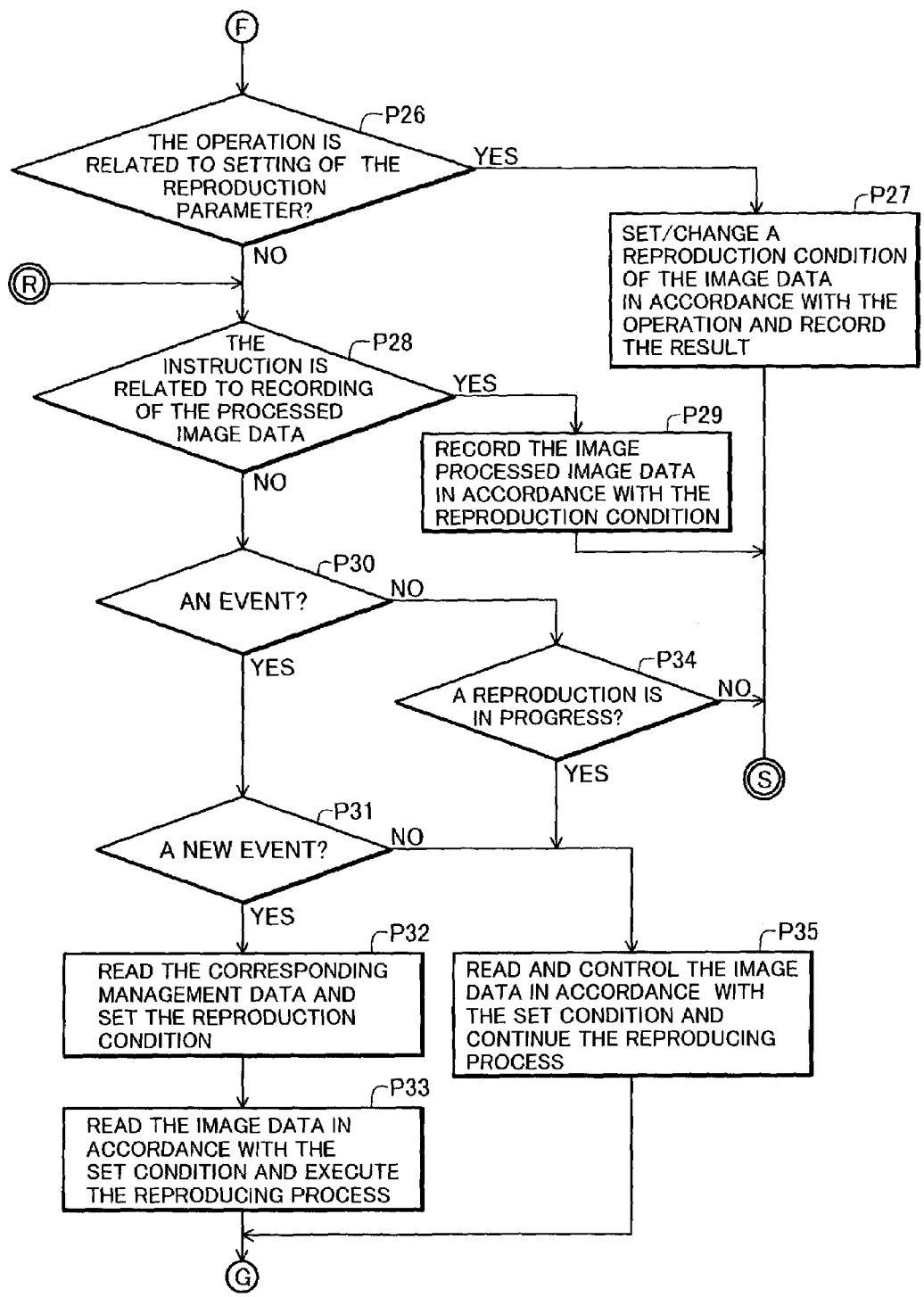
FIG. 9 is a fourth part (4/4) of the flow chart showing image controlling process according to the embodiment of the present invention.

When the instruction is judged to be related to reproduction of a pad image data at Step P19 (P19→YES), the flow proceeds to Step P26 (FIG. 9). At Step P26, whether the operation that generates the instruction is related to setting of reproduction parameters or not is judged. When the operation is a setting operation of the reproduction parameters (P26→YES), the flow proceeds to Step P27. At Step P27, reproduction conditions of the pad image data are set or changed in accordance with the setting operation, and the result of the operations is stored in the predetermined storage area of the specialized RAM 72 corresponding to the pad image data. Then, the flow returns to Step P2 (FIG. 6).

The reproduction parameters set or changed at Step P27 include, for example, image effect parameters and reproduction procedure parameters. Each image effect parameter is set to a target image data in accordance with a selecting operation (PAD/VIN/TOT) with image selecting switches PV or operations with the bank switch Bi and the pad switch Pdj (a pad operation event). A kind of parameter is selected by an operation of the parameter selecting switches EP, and the amount of the parameter is defined by an operation of the effect setting dials D1 and D2 (including the selection from the effect parameter table on the main display 13).

The reproduction procedure parameters are set for the pad image data designated by the pad operation event or the MIDI event and include a reading style corresponding to an event generation (start/stop by on/off event (Gate), start/stop responding only to on event (Trig)), a number of the reading times (once (1shot), looping reproduction (Loop)), a reading direction (a normal direction (Norm), a reversed direction (Revr)), a reading start position, a display style of the time of pausing the reproduction, etc.

When the reproduction parameters are newly set by the setting operation at Step P27, the newly set reproduction parameters are added to the management data loaded in the RAM 72 as reproduction conditions. When old reproduction conditions exist in the management data, the newly set reproduction parameters overwrite the reproduction conditions to renew the reproduction conditions.

When the operation is judged as not the setting operation for the reproduction parameters at Step P26 (P26→NO), and it is judged that the reproduction of the image data is in progress (the current mode is the reproduction mode such as the play mode PM or the external controlling mode MM) at Step P5 (FIG. 6) (P5→YES), the flow proceeds to Step P28. At Step P28, whether the instruction is related to recording the pad image to be processed or not judged. When the instruction is an instruction for recording the processed pad image data by the operation of the "WRIT" switch (the pad image data recording switch) (P28→YES), the flow proceeds to Step P29. At Step P29, a command for recording the currently reproduced pad image data processed in accordance with the currently set reproduction conditions is stored in the predetermined storage area in the specialized RAM 72 after that. Then, the flow returns to Step P2 (FIG. 6).

When it is judged that the instruction is not related to the recoding of the processed pad image data at Step P28 (P28→NO), the flow proceeds to Step P30. At Step P30, whether an operation of the panel switch device 12 or a control signal input from the external device contains an event or not is judged. When the content is the event (P30→YES), the flow proceeds to Step P32 for further judging whether the event is a new on event or not. When the event is a new on event (P31→YES), the management data corresponding to the new on event is read out, and the reproduction conditions of the pad image data correponding to the event are set at Step P32. Then, at Step P33, the pad image data is read out in accordance with the set reproduction parameters, and the data reading unit 73 and the image controlling unit 74 are instructed to execute the reproduction of the image. For example, the data reading unit 73 continues the reading of the pad image data until it reaches the stopping point of the reading in accordance with the reproduction procedure parameters in the reproduction conditions, and the image controlling unit 74 execute the effect adding process for designating luminance, hue, a size, a position, a synthesizing style (mix or overlay), etc. and transmits the image displaying signal representing the result of the process. At the following Step P22 (FIG. 8), as described in the above, the image display 15 executes a display control in accordance with the image displaying signal and displays a desired image.

When it is judged as not an event at Step P30 (P30→NO), the flow proceeds to Step P34. At Step P34, it is judged whether the reproduction is currently in progress or not. When the reproduction is not in progress (P34→NO), the flow returns to Step P2 (FIG. 6). When it is judged that the reproduction of the image is in progress at Step P34 (P34→YES), and when it is judged that the event is not a new event (e.g., regeneration of the on event, generation of off event, etc.)(P31→NO), the flow proceeds to Step P35.

At Step P35, the data reading unit 73 controls the reading of the pad image data in accordance with the currently set reproduction conditions, and the image controlling unit 74 executes the effect adding process in order to continue the reproduction of the image. For example, the data reading unit 73, in accordance with the currently set reproduction procedure parameters, continues to read the pad image data up to the stopping point if the reading and stops reading at the stopping point (1shot), or returns to the looping point (Loop). Moreover, the data reading unit 73 repeatedly starts and stops the reading of the pad image data with the regeneration of the on event (trigger), or stops the reading upon the generation of the off event (gate). Also, the image controlling unit 74, in accordance with the currently set image effect parameters, executes the effect adding process and transmits the image displaying signal to the image display 15. Then, at the next Step 10 P22 (FIG. 8), the image display 15 executes the image control corresponding to the image displaying signal. Thereafter, the flow returns to Step P2 (FIG. 6).

In the case that the flow proceeds from Step P33 or Step P35 to Step P22, for example, when the instruction for reproducing an image based on a new pad image data whereas other pad image data is being reproduced, the image reproducing processes are simultaneously executed in accordance with the reproduction conditions of the plurality of the pad image data at Step P22. In this case, the mixture parameter such as overlaying between each image may be different from each other. Also, the image effect parameters for each image such as the luminance parameter, the hue parameter, etc. are restricted by a hardware (or software) resource, therefore, for the image effect adding style, the image effect adding process is executed by defining priorities of the image effect parameters to be applied in accordance with a predetermined riles. When a plurality of images are simultaneously reproduced as described above, the following processes (a) to (e) can be executed in accordance with the predetermined rule.

(a) Normally, as far as possible, each pad image data is added with an image effect in accordance with the reproduction conditions set for each pad image data, and when the image adding process based on each reproduction conditions is not possible, the image effect adding process is executed with a newly designated reproduction condition for the pad image data, i.e., a later designated reproduction condition has a priority over a previously designated reproduction condition. In this case, the following method (a1) or (a2) may be used.

(a1) When reproduction starting points of two or more images are set to overlap the parts or all of the two or more images, a later reproduced image is overlaid on a previously reproduced image regardless of the reproduction condition (the mixture parameter) set for each pad image data.

(a2) For the effect process for each image itself such as luminance, hue, etc., it is possible to execute a plurality of the effect processes for the plurality of the pad image data when the effect circuit (or the effect module) for the effect process has a sufficient capacity for the execution. When the effect circuit has no sufficient capacity and the fact that there is no capacity is detected, the image effect for the reproduction of the previously reproduced image is stopped, and the image effect for the newly reproduced image is started by using the stopped circuit under the principal of the priority of the later reproduced image.

(b) In contrast with the above-described (a), the image effect parameters for the previously reproduced image can have a priority over the later reproduced image. For example, as a processing method relating to the overlaying style of the plurality of images and an occupying state of the effect circuit, a processing condition can be defined in accordance with the reproduction order as described in the following (b1) or (b2).

(b1) In order to avoid the previously reproduced image to be hidden by the later reproduced image, a priority is given to the previously reproduced image until the previously reproduced image is turned off by the reproduction being finished or stopped (off), that is, until the reproduction of the previously reproduced image is completed, and the later reproduced image is reproduced on the back of the previously reproduced image.

(b2) For the effect process for each image itself (luminance, hue, etc.), the effect for the later reproduced image may be executed with the effect circuit that happens to have a capacity due to the completion of the effect process for the previously reproduced image.

(c) The priority of the image effect may be a user selectable by defining the priorities of the plurality of the pad image data as the reproduction conditions in the reproduction condition setting process at Step P27 and making the image effect adding process executed in accordance with defined priority. For example, a priority rank of each pad image data is defined based on the setting operation of the user at Step P27. The defined priority rank of each pad image data is compared to the others, and the reproduction conditions having the higher priority rank are applied at Step P22. By that, the image effect adding process can be executed in accordance with the priority rank defined by the setting operation of the user.

(d) When there is a feeling of wrongness with that the applied image effects are intercepted by changing to the other image effect, the previously reproduced image is processed with the higher priority over the later reproduced image, and the later reproduced image is not processed, when the effect circuit has no more capacity at that time, until the reproduction of the previously reproduced image is completed (even if the effect circuit happens to have a capacity during the reproduction of the previously reproduced image).

(e) Not only when the numbers of the images to be added with the image effects are over the numbers of the effect circuit as described above, regardless of the capacity of the effect circuit, the applied image effect parameters can be defined only by the reproduction order of the image data. For example, the effect parameters for the image that is instructed to be displayed at first or at last in the images being reproduced may be applied to all the images.

Although the image controlling apparatus according to the embodiment turns into the play mode PM at the time of the power on or when the other modes are reset, the image controlling apparatus may be specially equipped with a play mode designating switch for turning the image controlling apparatus into the play mode PM.

Although, in the embodiment, the pad image data stored in the external storage unit such as a smart media or the like is input to the external storage unit from the image signal of the external image reproducing device via the motion picture recording unit and the specialized RAM, the removable storage medium such as a smart media storing the image data in advance can be used, or the image data can be stored to the external storage unit by using other image data inputting device.

Also, when events instructing reading of the pad image data are generated simultaneously by simultaneous operations of the pad switches, images based on the pad image data corresponding to both events may be displayed simultaneously. Also, it is possible to disregard both events. Furthermore, it is possible to validate the only one event in accordance with the predetermined priorities.

The present invention has been described in connection with the preferred embodiments. The invention is not limited only to the above embodiments. It is apparent that various modifications, improvements, combinations, and the like can be made by those skilled in the art.

What are claimed are:

1. An image controlling apparatus, comprising:
   a plurality of pad type operating devices;
   a plurality of image storage devices, each of which stores arbitrary image data corresponding to each one of the pad type operating devices;
   an operation detector that detects an operation of one of the plurality of pad type operating devices;
   a reading device that reads image data from one of the plurality of image storage devices corresponding to the pad type operating device of which operation is detected;
   an image generator that generates an image signal by processing the read image data;
   a video inputting device that inputs a video signal;
   a recording instruction device that instructs starting and ending of recording the video signal input by the video inputting device;
   a selector that selects one of the plurality of image storage devices; and
   a recorder that records image data based on the video signal from starting of recording is instructed to the ending the recording is instructed by the recording instruction device into said one of the plurality of image storage devices selected by the selector.

2. The image controlling apparatus according to claim 1, further comprising:
   a data storage device that stores the image data stored in the plurality of image storage devices; and
   a data transfer device that reads the image data stored in the plurality of image storage devices to store the image data into the data storage device.

3. The image controlling apparatus according to claim 1, wherein the image generator generates an image signal added with a predetermined image effect.

4. The image controlling apparatus according to claim 1, wherein each one of the plurality of image storage devices is assigned to each one of the plurality of pad type operating devices.

5. The image controlling apparatus according to claim 1, further comprising
   an event data inputting device that inputs event data; and
   wherein
   the plurality of image storage devices store arbitrary image data corresponding to each one of a plurality of event data; and
   the reading device reads image data from one of the plurality of image storage devices corresponding to a type of the event data input by the event data inputting device 6. The image controlling apparatus according to claim 5, further comprising:
   an event data generator that generates event data corresponding to the pad type operating device of which operation is detected, and
   wherein the event data inputting device inputs the event data generated by the event data generator.

7. The image controlling apparatus according to claim 5, further comprising:
   a receiver that receives an input signal from an external device; and
   an event data detector that detects event data in the input signal received by the receiver, and
   wherein the event data inputting device input the event data detected by the event data detector.

8. An image controlling apparatus, comprising:
   a plurality of pad type operating devices;
   a plurality of image storage devices, each of which stores arbitrary image data corresponding to each one of the pad type operating devices;
   an operation detector that detects an operation of one of the plurality of pad type operating devices;
   a reading device that reads image data from one of the plurality of image storage devices corresponding to the pad type operating device of which operation is detected;
   an image generator that generates an image signal by processing the read image data;
   a video inputting device that inputs a video signal;
   a synthesized image generator that generates a synthesized image signal by synthesizing the video signal input by the video inputting device with the image signal generated by the image generator; and an output device that outputs the synthesized image signal generated by the synthesized image generator.

9. The image controlling apparatus according to claim 8, further comprising:

a data storage device that stores the image data stored in the plurality of image storage devices; and a data transfer device that reads the image data stored in the plurality of image storage devices to store the image data into the data storage device.

10. The image controlling apparatus according to claim 8, wherein the image generator generates an image signal added with a predetermined image effect.

11. The image controlling apparatus according to claim 8, wherein each one of the plurality of image storage devices is assigned to each one of the plurality of pad type operating devices.

12. The image controlling apparatus according to claim 8, further comprising an event data inputting device that inputs event data; and wherein the plurality of image storage devices store arbitrary image data corresponding to each one of a plurality of event data; and the reading device reads image data from one of the plurality of image storage devices corresponding to a type of the event data input by the event data inputting device.

13. The image controlling apparatus according to claim 12, further comprising:

an event data generator that generates event data corresponding to the pad type operating device of which operation is detected, and wherein the event data inputting device inputs the event data generated by the event data generator.

14. The image controlling apparatus according to claim 12, further comprising:

a receiver that receives an input signal from an external device; and an event data detector that detects event data in the input signal received by the receiver, and wherein the event data inputting device input the event data detected by the event data detector.

* * * * *